(12) United States Patent
Hsieh

(10) Patent No.: US 7,036,836 B2
(45) Date of Patent: May 2, 2006

(54) AUTOMATIC SPEED CHANGE DEVICE FOR BICYCLE GEARBOX

(75) Inventor: Jung-Chai Hsieh, Miaoli (TW)

(73) Assignee: Alfa Power Co., Ltd., Taipei (TW)

( * ) Notice: Subject to any disclaimer, the term of this patent is extended or adjusted under 35 U.S.C. 154(b) by 0 days.

(21) Appl. No.: 10/667,620

(22) Filed: Sep. 22, 2003

(65) Prior Publication Data

US 2004/0097308 A1 May 20, 2004

(51) Int. Cl.
*B62M 1/02* (2006.01)

(52) U.S. Cl. .......................................... 280/261; 474/70

(58) Field of Classification Search ................ 280/260, 280/261; 180/206, 207; 474/70, 75, 78, 79, 474/80

See application file for complete search history.

(56) References Cited

U.S. PATENT DOCUMENTS

| | | | | | |
|---|---|---|---|---|---|
| 3,613,466 A | * | 10/1971 | Houghton | .................... | 474/70 |
| 3,929,025 A | * | 12/1975 | Perry | .......................... | 474/70 |
| 3,939,932 A | * | 2/1976 | Rosen | ........................ | 180/206 |
| 4,693,700 A | * | 9/1987 | Chappell | ...................... | 474/80 |
| 5,407,396 A | * | 4/1995 | Gilbert | ......................... | 474/80 |
| 5,618,240 A | * | 4/1997 | Gilbert | ......................... | 474/50 |
| 5,758,735 A | * | 6/1998 | MacCready et al. | ........ | 180/206 |
| 6,159,118 A | * | 12/2000 | Campbell | ..................... | 474/78 |

* cited by examiner

*Primary Examiner*—Daniel G. DePumpo
(74) *Attorney, Agent, or Firm*—Leong C. Lei

(57) ABSTRACT

A structure of an automatic speed change device for bicycle gearbox is disclosed in this present invention. The above-mentioned design can be applied to a bicycle with a rear wheel speed change device. According to this invention, the automatic speed change device is able to control the allotting device of the rear wheel speed change device to transfer the chain into suitable gear by the treading rat of the user. This design can simplify the manual gear shifting process in the prior art for controlling the rear wheel speed change device. Therefore, this invention can make riding bicycle more easily and widely for all age.

6 Claims, 4 Drawing Sheets

AUTOMATIC SPEED CHANGE DEVICE FOR BICYCLE GEARBOX

BACKGROUND OF THE INVENTION

1. Field of the Invention

This present invention relates to an automatic speed change device for bicycle gearbox, and more particularly to an automatic speed change device, which is employed to control the speed change and the gears shift of the rear wheel upon the treading rate of the user.

2. Description of the Prior Art

With the technology development, human's transportation is with variety and multi-function. Now, most people living in towns or cities employ automobiles or motorcycles as transportation. Bicycle becomes an entertainment or transportation for short distance thereof. Besides, in some smaller towns, most people still prefer employing bicycles as their transportation tools. Originally, a bicycle is driven by a single front gear and a single rear gear. With the development of bicycle, a bicycle in today can be driven with manual speed change mode by adding a rear wheel speed change device. Therefore, most bicycles at present comprise a rear wheel speed change device for the user to manual adjust the gear upon the road condition. Generally, when riding on level ground or the downgrade, the speed change gear set of the rear wheel speed change device has to be shifted to a smaller gear for speeding up. At that time, the treading force of the user is increased, and the treading rate thereof is decreased. Oppositely, when riding on an upgrade, the speed change gear set of the rear wheel speed change device has to be shifted to a greater gear, and thus the rear wheel can be rotated in slower speed but greater power. As so, the treading rate of the user is decreased, and the treading rate can be increased. In other words, the user can pay less effort and get more kinetics by the mentioned design. Therefore, bicycles with the mentioned design are favored by young users as transportation tool when going outside. However, the above-mentioned design is not convenient enough. The rear wheel speed change device is controlled by the allotting device of the speed change gear set, and the allotting device is controlled by the speed change rod disposed at the handle of the bicycle. Hence, if the user is too old or too young to use the speed change function well, the speed change function of the bicycle cannot be applied as its original design.

Hence, it is an important object of developing a structure of automatic speed change device for bicycle gearbox for simplifying the speed change process and making riding more easily for all age.

SUMMARY OF THE INVENTION

In accordance with the present invention, an automatic speed change device for bicycle gearbox is provided, wherein the design of this invention can automatic perform speed change and gear shift depending on the treading rate of the user of the bicycle. Thus, the user can ride the bicycle more easily and the speed and the gear can be automatically adjusted in accordance with the topography undulate of roadway.

It is another object of this invention to provide a structure of an automatic speed change device for bicycle gearbox. The mentioned design is able to perform speed change upon personal riding habit, and thus the design can suit for all age.

It is still another object of this present invention to provide an automatic speed change device for bicycle gearbox. The design is employed for simplifying the manual speed change process.

In accordance with the above-mentioned objects, this invention provides an automatic speed change device for bicycle gearbox. The above-mentioned design comprises three-points-orientation gears. The gears are winded by a chain. When the chain generating a force in one direction, the left side and the right side gears can be rotated pivotally, and the third gear in the middle downward can be rotated pivotally and removed vertically. The displacement of the third gear is controlled by the strain of the chain thereto.

Besides, the above-mentioned design comprises a connecting element coupled with the middle downward gear. One end of the connecting element is coupled with the shaft base of the middle downward gear, and another end of the connecting element is coupled with a lock-shaft. The lock-shaft is coupled with a hauling line. When the middle downward gear moving vertically, the hauling line is affected. At that time, the allotting device of the rear wheel speed change device coupled with the hauling line is acted, and the position of the chain on the gear of the speed change gear set can be shifted.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Then, the components of the semiconductor devices are not shown to scale. Some dimensions are exaggerated to the related components to provide a more clear description and comprehension of the present invention.

Figure 1:
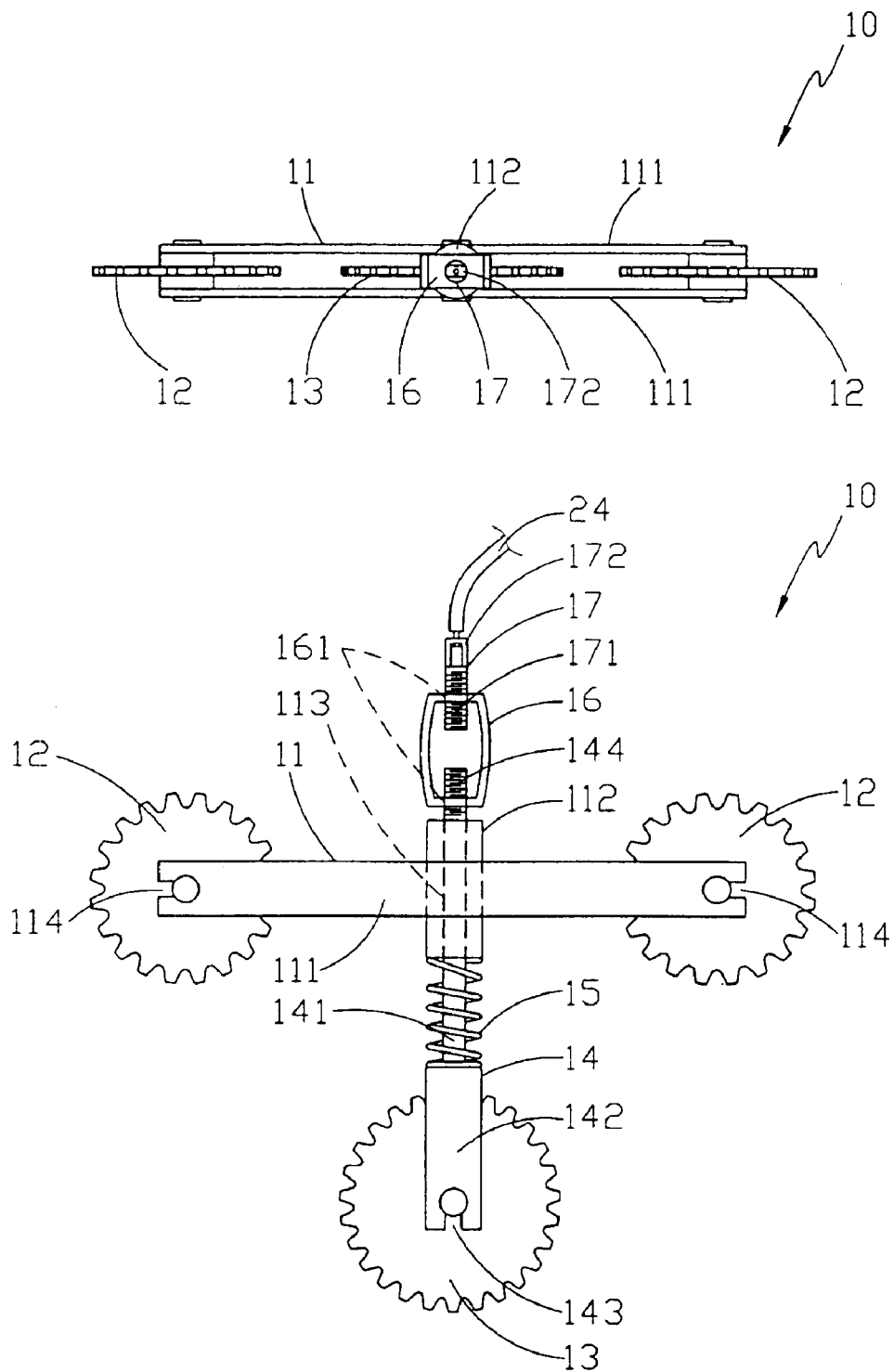
FIG. 1 depicts a top view and a front view of an automatic speed change device of this invention.

One preferred embodiment of this invention is an automatic speed change device for bicycle gearbox. Referring to FIG. 1, the automatic speed change device 10 comprises a body 11, gears 12 and 13, a shaft base 14, a spring 15, a connecting element 16, and a lock-shaft 17. The body is constructed of front and behind planks 111, and a hollow column 112 is formed between the planks 111. Via positioning an aperture 113 in the hollow column 112, a shaft 141 formed from one end of the shaft base 14 can be set therein. The front and behind planks 111 comprises gaps 114 at both side thereof, and the gears 12 are embedded axially at the gaps 114. One end of the shaft base 14 is a shaft 141. According to the figure, the shaft 141 comprises a clip element 142. A gap 143 is downward to the clip element 142 and at the end side of the shaft 141, and thus a gear 13 is embedded axially thereon. The shaft 141 is through a spring 15, and the hollow column 112 of the body 11. The end portion of the shaft 141 comprises a thread part 144 screwed on one end of the connecting element 16. The connecting element 16 is a framework as shown in FIG. 1. The upper and lower portions of the connecting element 16 respectively comprise a thread hole 161. The lower thread hole 161 is employed for screwing the shaft base 14, and the upper thread hole 161 is used to screw a lock-shaft 17. One end of the lock-shaft 17 is a thread part 171, and the other end of the lock-shaft 17 is a connecting part 172. The thread part 171 is screwed within the upper thread hole 161 of the connecting element 16. The connecting part 172 is coupled with one end of a hauling line 24. According to the above-mentioned design, an automatic controlling device is assembled, wherein the automatic controlling device is able to automatically change speed and shift gear with user's treading rate. Therefore, the design of this specification can provide the user riding bicycle more easily and shifting gear automatically upon the road surface condition and topography for suiting the user.

Figure 2:
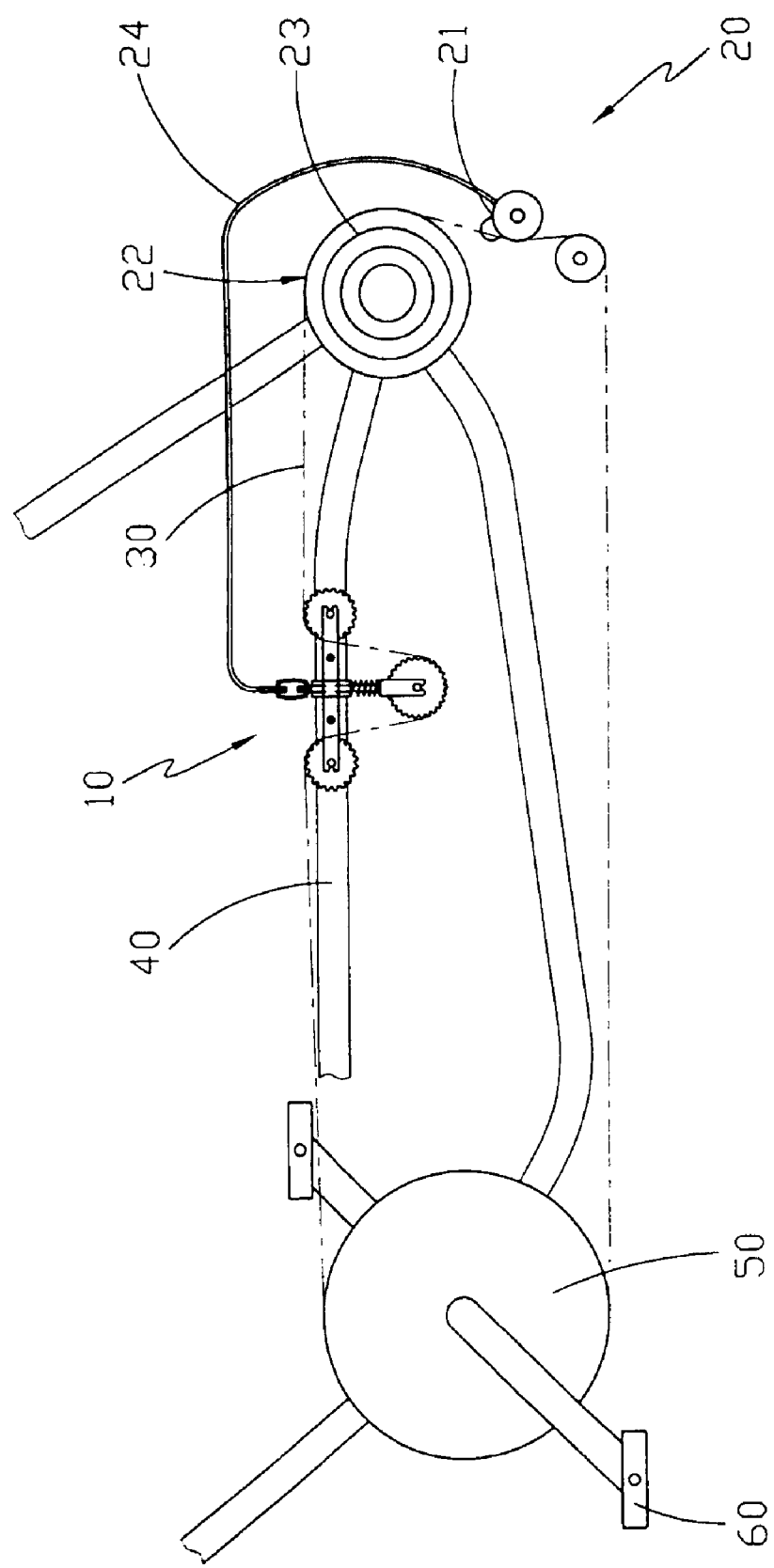
FIG. 2 depicts a profile of disposing the automatic speed change device onto a bicycle frame according to one preferred embodiment of this invention.

Referring to FIG. 2, the above-mentioned automatic speed change device of this invention is disposed onto a suitable position of the frame 40 of a bicycle. The speed change device is disposed at the same side of the rear wheel speed change device 20, and between the driving chain wheel 50 and the speed change gear set 22. One end thereof is coupled with the automatic speed change device 10 with the hauling line 24, and the other end thereof is coupled with the allotting device 21 of the rear wheel speed change device 20. Therefore, the automatic speed change device 10 can transfer a message to the allotting device 21 of the rear wheel speed change device 20 for speed changing and gear shifting.

Figure 3:
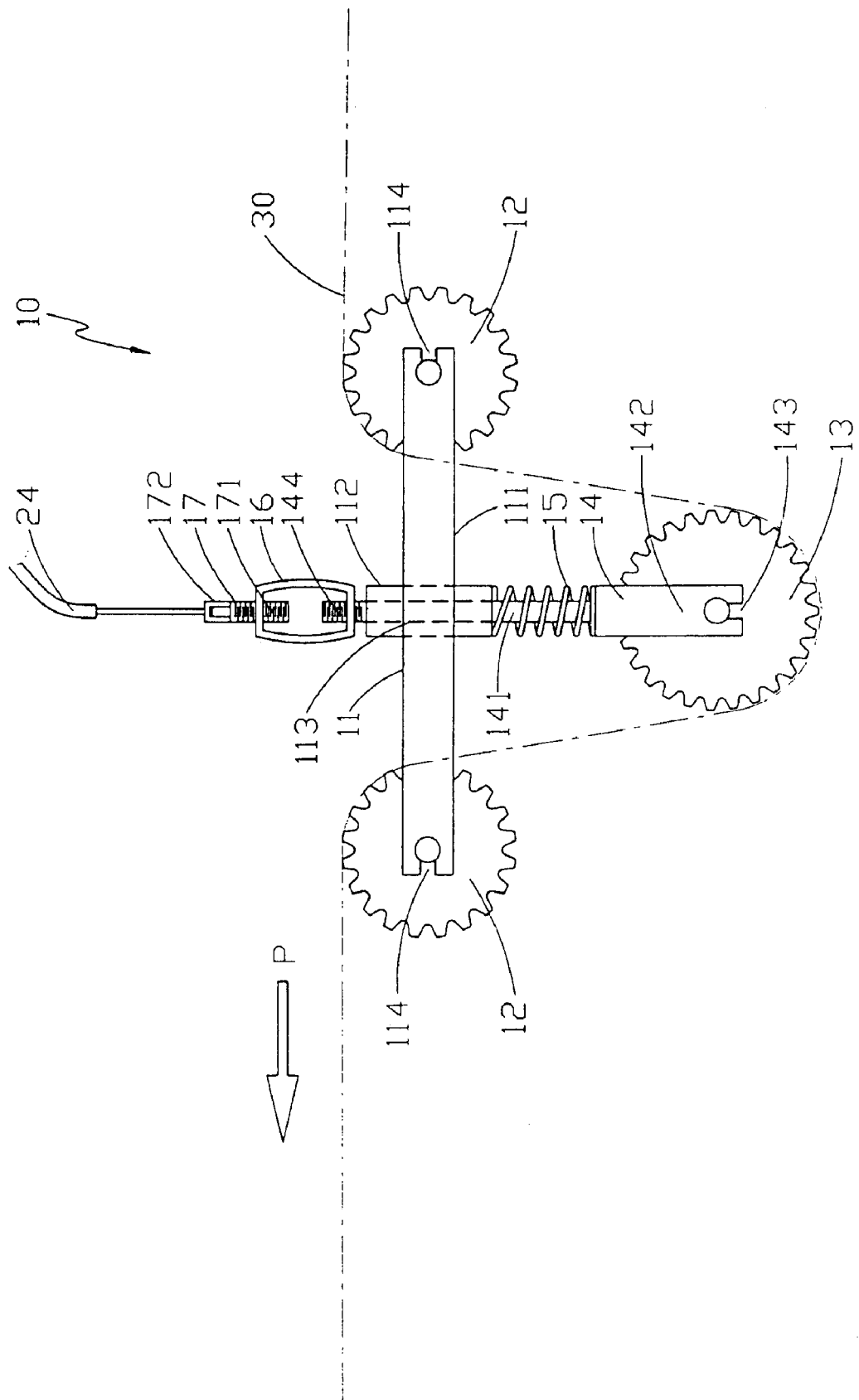
FIG. 3 depicts a diagram of carrying out the automatic speed change device of this invention.
Figure 4:
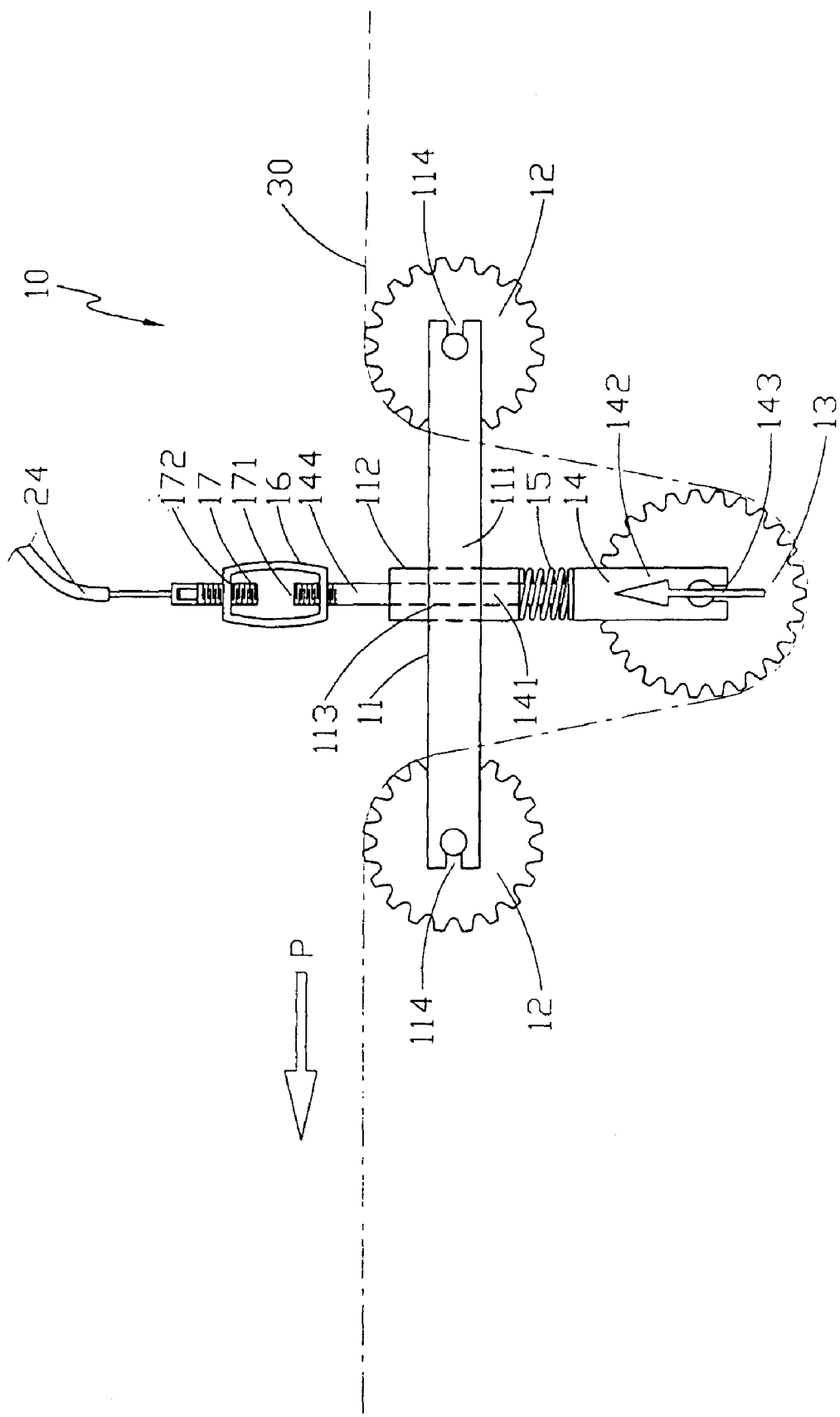
FIG. 4 depicts another diagram of carrying out the automatic speed change device of this invention.

Referring to FIG. 2 and FIG. 3, when treading treadles 60 of a bicycle, the driving chain wheel 50 is rotated in the same direction synchronously. The chain 30 is acted by the rotation of the driving chain wheel 50, and producing a force (P) in a direction. The original gear of the bicycle is set at low speed gear. That is, the chain 30 is first winded through the allotting device 21 of the rear wheel speed change device 20, and then winded through the biggest gear 23 of the speed change gear set 22. Thus, the user can ride the bicycle by treading the treadles 60 more easily. When the user treading the treadles 60 faster, the bicycle is speeded up and the force (P) of the chain 30 is greater. Also referring to FIG. 4, when the chain 30 winded through the gears 12 and 13 of the automatic speed change device 10, the gear 13 and the shaft base 14 pivoted with the gear 13 will be removed upward vertically by strain. Thus, the connecting element 16 screwed with the shaft base 14 and the lock-shaft 17 screwed on the connecting element 16 are acted synchronously. The allotting device 21 of the rear wheel speed change device 20 is affected by the hauling line 24 coupled with the other end of the lock-shaft 17. Therefore, the chain 30 winded through the rear wheel speed change device 20 is transferred from the greatest gear 23, the lower speed gear, into a smaller gear 23, the higher speed gear, of the speed change gear set 22.

Hence, when the force (P) becomes greater, the gear is higher. When the force (P) becomes smaller, the gear is able to return to the lower speed gear by the spring 15 of the automatic speed change device 10. Consequently, the above-mentioned design can automatically adjust the gear shift and speed change for suiting the user's riding habit and the road condition.

Although specific embodiments have been illustrated and described, it will be obvious to those skilled in the art that various modifications may be made without departing from what is intended, but not to be limited solely by the appended claims.

What is claimed is:

1. A structure of an automatic speed change device for bicycle gearbox, comprising:

a body consisted of a front plank and a rear plank, wherein the body comprises a hollow column between the front plank and the rear plank;

a shaft base, wherein one end of the shaft base is a shaft, wherein the shaft comprises a thread part and a clip element positioned at an extension of the shaft;

a connecting element, wherein said connecting element is a framework and the upper and lower portion of said connecting element respectively comprise an aperture;

a lock-shaft, wherein one end of said lock-shaft is formed in a thread part and another end of said lock-shaft is formed in a connecting part;

a spring disposed on said shaft of said shaft base, wherein said spring is between said clip element of said shaft base and said hollow column of said body; and gears respectively positioned at both sides of said body and one end of said clip element of said shaft base;

whereby said automatic speed change device is constructed and assembled onto a bicycle, the above-mentioned design is able to control the speed change and gear shift of a rear wheel speed change device with the treading rate of an user, and thus the user can ride more easily and the gear shift is automatically adjusted by road conditions.

2. The structure according to claim 1, wherein said front plank and said rear plank of said body respectively comprise apertures at the sides thereof.

3. The structure according to claim 1, wherein said gears positioned at both sides of said body can be disposed pivotally.

4. The structure according to claim 1, wherein said clip element further comprises an aperture at one end thereof.

5. The structure according to claim 1, wherein said gear positioned at one end of said clip element is pivotally disposed therein.

6. The structure according to claim 1, wherein said connecting part of said lock-shaft is coupled with a hauling line of the rear wheel speed change device.

* * * * *